United States Patent [19]

Tomikawa et al.

[11] Patent Number: 5,286,444
[45] Date of Patent: Feb. 15, 1994

[54] COPPER BEARING ALLOY

[75] Inventors: Takashi Tomikawa; Yoshio Kumada, both of Toyota, Japan

[73] Assignee: Taiho Kogyo Co., Ltd., Aichi, Japan

[21] Appl. No.: 862,541

[22] PCT Filed: Nov. 28, 1991

[86] PCT No.: PCT/JP91/01634

§ 371 Date: Jun. 18, 1992

§ 102(e) Date: Jun. 18, 1992

[30] Foreign Application Priority Data

Nov. 30, 1990 [JP] Japan ................................ 2-339520

[51] Int. Cl.$^5$ ................................................ C22C 9/08
[52] U.S. Cl. .................................... 420/491; 420/472; 420/474; 420/475; 420/477; 420/481; 420/485; 420/490; 420/499; 148/432
[58] Field of Search ............... 420/474, 472, 473, 475, 420/477, 481, 485, 490, 491, 499; 148/432

[56] References Cited

U.S. PATENT DOCUMENTS 4,879,094 11/1989 Rushton ..................... 420/475

FOREIGN PATENT DOCUMENTS

| | | |
|---|---|---|
| 61-73849 | 4/1961 | Japan ................................ 420/491 |
| 49-9295 | 3/1974 | Japan . |
| 53-36415 | 10/1978 | Japan . |
| 53-47284 | 12/1978 | Japan . |
| 57-73146 | 5/1982 | Japan . |
| 57-76142 | 5/1982 | Japan . |
| 2027449 | 2/1980 | United Kingdom ................ 420/491 |

Primary Examiner—John P. Sheehan
Attorney, Agent, or Firm—Flynn, Thiel, Boutell & Tanis

[57] ABSTRACT

Copper bearing alloy comprises more than 4% by weight and up to 35% by weight of Bi, 0.2 to less than 1.5% by weight of Pb and the rest of Cu. This considerably improves the erosion resistance while maintaining the excellent seizure resistance and fatigue strength.

3 Claims, No Drawings

COPPER BEARING ALLOY

TECHNICAL FIELD

The invention relates to copper bearing alloy, and more particularly, to copper bearing alloy containing Pb.

BACKGROUND OF THE PRIOR ART

Cu-Pb bearing alloy is known in the art, as is Cu-Pb bearing alloy which also contains Bi (see Japanese Patent Publications No. 36,415/1978, No. 9,295/1974 and No. 47,284/1978).

Cu-Pb bearing alloy generally exhibits excellent seizure resistance and fatigue strength, but is subject to an erosion of Pb layer as the lubricant used becomes degraded, with a consequent likelihood of causing a seizure or abnormal abrasion.

DISCLOSURE OF THE INVENTION

Accordingly, the invention contemplates to provide copper bearing alloy having improved erosion resistance while maintaining the seizure resistance and fatigue strength.

Thus, copper bearing alloy according to the invention comprises more than 4% and up to 35% by weight of Bi, 0.2 to less than 1.5% by weight of Pb and the rest of Cu.

According to the invention, at least one of 0.1 to 5% by weight of Sn, 0.1 to 1% by weight of Zn, 0.1 to 1% by weight of Si, 0.1 to 1% by weight of Sb, 0.01 to 1% by weight of P and 0.1 to 5% by weight of Ni may be added to the above composition.

In accordance with the invention, the erosion resistance is improved by substituting Bi which exhibits an excellent erosion resistance for Pb which is problematic in respect of erosion resistance. However, when Bi is completely substituted for Pb, the compatibility and the seizure resistance will be degraded, and accordingly such degradation is prevented by leaving a smaller addition of Pb.

In accordance with the invention, the amount of Bi added exceeds 4% by weight, but is limited to 35% by weight. Below 4% by weight, the seizure resistance will be insufficient while if the limit of 35% by weight is exceeded, the strength will be degraded, resulting in a degradation of both the seizure resistance and the fatigue strength. A preferred range of addition is from 15 to 25% by weight.

The amount of Pb added is in a range from 0.2 to less than 1.5% by weight. Below 0.2% by weight, there is no addition effect while above 1.5% by weight, the melting point of Bi will be lowered to degrade the heat resistance as well as the erosion resistance. A more preferred range is from 1 to 1.4% by weight.

The purpose of adding one or more of Sn, Zn, Si, Sb, P and Ni as required is to strengthen Cu matrix to improve the fatigue strength. The amount of Sn, Ni added is each in a range from 0.1 to 5% by weight while the amount of Zn, Si, Sb and P added is each in a range from 0.1 to 1% by weight, and the amount of P added is in a range from 0.01 to 1% by weight.

Each of such additions will produce no addition effect if the amount of addition is less than the minimum limit, while if the upper limit is exceeded, Cu matrix becomes hardened and brittle. Since a slight amount of Sn becomes admixed with Bi to lower its melting temperature, it cannot be added in a significant amount, Zn, Si, P and Ni has the effect of improving the erosion resistance and heat resistance by alloying with Cu. In addition, Sb strengthens Cu matrix and becomes dissolved into Bi, and hence it cannot be added in a significant amount because it causes a brittling of Bi.

A preferred amount of Sn, Zn, Si, Sb, P and Ni added is from 1 to 3% by weight for Sn, from 0.5 to 0.7% by weight for Zn, from 0.3 to 0.5% by weight for Si, from 0.3 to 0.5% by weight for Sb, from 0.05 to 0.5% by weight for P and from 1 to 3% by weight for Ni.

BEST FORMS TO CARRY OUT THE INVENTION

Alloy powder or component powder are blended together in a required proportions and the entire composition is adjusted to respective component proportion given in Table 1. Subsequently, the powder is dispersed on an iron plate to sinter at a temperature from 700° to 850° C. Subsequently, the assembly is rolled down to remove voids, and is then re-sintered. Such bimetal is stamped or cut out to provide test pieces each having a cross sectional area of 2 cm$^2$. Samples 1 to 25 thus manufactured according to the invention and controls A to E which are manufactured under corresponding conditions are subjected to the following test conditions to determine an erosion diminution, seizure load and fatigue surface pressure.

Erosion Test Conditions

A test piece is immersed in an aged oil at a temperature of 150° C., and air is blown into the air to boil the test piece in oil for 200 hours while stirring the oil, thus determining an erosion diminution.

Seizure Test Conditions

A testing machine of pin-on-disc type
Disc: S55C hardened plate
Test piece: Mounted on a pin which is located 50 mm away from the center of the disc.
Peripheral speed: 10 m/sec
Load: starting the test from a load of 20 kg, and subsequently the load is incrementally increased by 20 kg per 20 minutes.
Lubricant: 10W-30 sprayed
Spray atmosphere temperature of lubricant: 30° C.

Fatigue Test Conditions

Reciprocating load fatigue testing machine
Number of revolutions: 2500 to 3500 rpm
Oil temperature: 140° C.
Lubricant: 10W-30 SD A maximum surface pressure is obtained which exhibits no fatigue after 10$^7$ cycles.

TABLE 1

|  | No. | Cu | Bi | Pb | Sn | Zn | Si | Sb | P | Ni | Erosion diminution (mg) | Seizure load (kg/cm$^2$) | Fatigue surface pressure (kg/cm$^2$) |
|---|---|---|---|---|---|---|---|---|---|---|---|---|---|
| Samples according to the invention | 1 | Bal. | 5 | 0.8 | | | | | | | 0.1 | 180 | 800 |
| | 2 | " | 10 | 1.45 | | | | | | | 0.1 | 200 | 800 |
| | 3 | " | 15 | 1.0 | | | | | | | 2.0 | 240 | 750 |
| | 4 | " | 25 | 0.2 | | | | | | | 2.7 | 240 | 550 |
| | 5 | " | 35 | 1.0 | | | | | | | 5.1 | 340 | 550 |
| | 6 | " | 4.1 | 1.0 | | | | | | 0.5 | 0.8 | 180 | 850 |
| | 7 | " | 5 | 1.2 | 5 | | 1 | | | | 0.8 | 200 | 1000 |
| | 8 | " | 5 | 1.2 | 5 | | 0.5 | | | 1 | 0.8 | 180 | 1150 |
| | 9 | " | 10 | 0.2 | | | | | 0.5 | | 2.1 | 220 | 850 |
| | 10 | " | 10 | 0.5 | 1 | | | | 0.5 | | 1.9 | 240 | |
| | 11 | " | 10 | 0.5 | | | | | | 5 | 2.0 | 240 | 1050 |
| | 12 | " | 10 | 1.45 | 2 | | | | 0.1 | 5 | 2.1 | 240 | 1150 |
| | 13 | " | 15 | 0.5 | 0.5 | 0.5 | 0.5 | 0.5 | | 0.1 | 2.1 | 240 | |
| | 14 | " | 15 | 0.9 | | | | | | 1 | 2.0 | 240 | 800 |
| | 15 | " | 15 | 1.0 | 2 | | | | | | 2.2 | 280 | 850 |
| | 16 | " | 15 | 1.0 | 2 | | 0.5 | | | | 2.2 | 280 | |
| | 17 | " | 15 | 1.0 | 3 | | | | | 0.5 | 2.3 | 280 | 950 |
| | 18 | " | 15 | 1.0 | | | | | 0.5 | 0.5 | 2.0 | 280 | |
| | 19 | " | 15 | 1.45 | 0.1 | 0.2 | 0.2 | 0.2 | 0.1 | | 2.4 | 300 | |
| | 20 | " | 25 | 1.0 | 0.1 | | | | | 3 | 2.5 | 280 | 700 |
| | 21 | " | 25 | 1.2 | 3 | | | 0.01 | | | 2.6 | 300 | 750 |
| | 22 | " | 25 | 1.45 | | | | | | 0.1 | 3.0 | 320 | |
| | 23 | " | 35 | 0.2 | 5 | | | | 0.5 | 2 | 5.0 | 280 | 850 |
| | 24 | " | 35 | 0.8 | | | | 0.5 | | | 4.8 | 320 | 600 |
| | 25 | " | 35 | 1.45 | | | | | | 4.0 | 320 | 850 | |
| Controls | A | Bal. | 10 | 10 | | | | | | | 58 | 200 | 650 |
| | B | " | | 30 | 5 | | | | | | 127 | 320 | 700 |
| | C | " | | 30 | 5 | | | | 0.05 | | 130 | 320 | |
| | D | " | 10 | 10 | 2 | | | | | | 30 | 240 | |
| | E | " | 3 | 20 | 5 | | | 0.5 | | | 18 | 280 | 900 |

From the results of the test shown in Table 1, it is seen that the erosion diminution of all the samples according to the invention are considerably improved over the controls, thus exhibiting an excellent erosion resistance. In samples 1 to 5, it is noted that while an increased addition to Bi improves the seizure resistance, it tends to reduce the fatigue strength. However, when one or more of Sn, Zn, Si, Sb, P and Ni is added, the fatigue strength can be improved by suppressing or compensating for the tendency to decrease.

What is claimed is:

1. Copper bearing alloy consisting of more than 4% by weight and up to 35% by weight of Bi, 0.2 to less than 1.5% by weight of Pb and the rest of Cu.

2. Copper bearing alloy consisting of more than 4% by weight of up to 35% by weight of Bi, 0.2 to less than 1.5% by weight of Pb, at least one of from 0.1 to 5% by weight of Sn, from 0.1 to 1% by weight of Zn, from 0.1 to 1% by weight of Si, from 0.1 to 1% by weight of Sb, from 0.01 to 1% by weight of P, and from 0.1 to 5% by weight of Ni and the remainder Cu.

3. Copper bearing alloy consisting of more than 4% by weight and up to 35% by weight of Bi, 0.2 to less than 1.5% by weight of Pb, at least one of from 1 to 3% by weight of Sn, from 0.5 to 0.7% by weight of Zn, from 0.3 to 0.5% by weight of Si, from 0.3 to 0.5% by weight of Sb, from 0.05 to 0.5% by weight of P, and from 1 to 3% by weight of Ni and the remainder Cu.

* * * * *

UNITED STATES PATENT AND TRADEMARK OFFICE
CERTIFICATE OF CORRECTION

PATENT NO. : 5,286,444
DATED : February 15, 1994
INVENTOR(S) : Takashi TOMIKAWA, et al It is certified that error appears in the above-identified patent and that said Letters Patent is hereby corrected as shown below:

Column 4, line 33; after "weight" insert ---and---.

Signed and Sealed this

Sixteenth Day of August, 1994

Attest:

BRUCE LEHMAN

Attesting Officer

Commissioner of Patents and Trademarks